US005944650A

United States Patent [19]

Hu et al.

[11] Patent Number: 5,944,650

[45] Date of Patent: Aug. 31, 1999

[54] SURFACTANTS

[75] Inventors: Nan-Xing Hu, Oakville; Paul F. Smith, Toronto; Beng S. Ong, Mississauga, all of Canada

[73] Assignee: Xerox Corporation, Stamford, Conn.

[21] Appl. No.: 08/960,754

[22] Filed: Oct. 29, 1997

[51] Int. Cl.$^6$ .............................. B01F 17/14; C07F 9/09; C07F 9/11

[52] U.S. Cl. .............................. 516/57; 516/908; 558/99; 558/102; 558/165; 558/186

[58] Field of Search .............................. 252/351; 558/102, 558/132, 164, 186, 99, 165; 516/57, 908

[56] References Cited

U.S. PATENT DOCUMENTS

| | | | |
|---|---|---|---|
| 2,561,493 | 7/1951 | Caprio et al. | 558/102 X |
| 2,782,128 | 2/1957 | Paist et al. | 558/164 X |
| 3,391,083 | 7/1968 | Irani et al. | 252/351 X |
| 3,462,520 | 8/1969 | Nehmsmann et al. | 252/351 X |
| 3,666,843 | 5/1972 | Fearing | 558/186 |
| 3,755,509 | 8/1973 | Nunn, Jr. et al. | 558/186 |
| 3,799,956 | 3/1974 | Nakamura et al. | 252/351 X |
| 3,869,526 | 3/1975 | Combey et al. | 558/164 X |
| 4,056,480 | 11/1977 | Herber | 252/78.5 |
| 4,072,704 | 2/1978 | Langdon | 558/266 |
| 4,137,188 | 1/1979 | Uetake et al. | 430/111 |
| 4,220,611 | 9/1980 | Wolf | 252/351 X |
| 4,353,834 | 10/1982 | Langdon | 554/43 |
| 4,465,516 | 8/1984 | Danner et al. | 558/186 X |
| 4,797,339 | 1/1989 | Maruyama et al. | 430/109 |
| 4,983,488 | 1/1991 | Tan et al. | 430/137 |
| 4,996,127 | 2/1991 | Hasegawa et al. | 430/109 |
| 5,066,560 | 11/1991 | Tan et al. | 430/137 |
| 5,244,726 | 9/1993 | Laney et al. | 428/312.6 |
| 5,275,647 | 1/1994 | Winnik | 106/22 E |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,344,738 | 9/1994 | Kmiecik-Lawrynowicz et al. | 430/137 |
| 5,346,797 | 9/1994 | Kmiecik-Lawrynowicz et al. | 430/137 |
| 5,348,832 | 9/1994 | Sacripante et al. | 430/109 |
| 5,364,729 | 11/1994 | Kmiecik-Lawrynowicz et al. | 430/137 |
| 5,366,841 | 11/1994 | Patel et al. | 430/137 |
| 5,370,963 | 12/1994 | Patel et al. | 430/137 |
| 5,372,743 | 12/1994 | Miyamoto et al. | 558/186 X |
| 5,403,693 | 4/1995 | Patel et al. | 430/137 |
| 5,405,728 | 4/1995 | Hopper et al. | 430/137 |
| 5,418,108 | 5/1995 | Kmiecik-Lawrynowicz et al. | 430/137 |
| 5,496,676 | 3/1996 | Croucher et al. | 430/137 |
| 5,501,935 | 3/1996 | Patel et al. | 430/137 |
| 5,527,658 | 6/1996 | Hopper et al. | 430/137 |
| 5,585,215 | 12/1996 | Ong et al. | 430/107 |
| 5,608,100 | 3/1997 | Sicken | 558/164 |
| 5,650,255 | 7/1997 | Ng et al. | 430/137 |
| 5,650,256 | 7/1997 | Veregin et al. | 430/137 H |
| 5,766,818 | 6/1998 | Smith et al. | 430/137 |

FOREIGN PATENT DOCUMENTS

| | | |
|---|---|---|
| 57210345 | 12/1982 | Japan . |
| 08234502 | 9/1996 | Japan . |
| 1050747 | 12/1966 | United Kingdom . |

*Primary Examiner*—Richard D. Lovering
*Attorney, Agent, or Firm*—E. O. Palallo

[57] ABSTRACT

A surfactant composition represented by Formulas (I), (II) or (III); or optionally mixtures thereof (I)

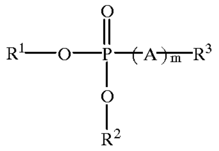

(II)

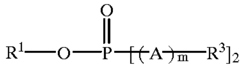

(III)

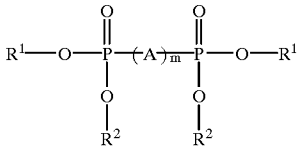

wherein $R^1$ is a hydrophobic moiety of alkyl or aryl, and wherein alkyl contains from about 4 to about 60 carbon atoms and aryl contains from about 6 to about 60 carbon atoms; $R^2$ is selected from the group consisting of alkyl and aryl, wherein alkyl contains from 1 to about 60 carbon atoms and aryl contains from about 6 to about 60; $R^3$ is hydrogen or alkyl of from 1 to about 10 carbon atoms; A is a hydrophilic polymer chain; m is the number of repeating segments of the hydrophilic polymer chain and is a number of from about 2 to about 500.

13 Claims, No Drawings

SURFACTANTS

PENDING APPLICATION

There are illustrated in U.S. Pat. No. 5,766,818, entitled "Toner Processes", filed concurrently herewith, and the disclosure of which is totally incorporated herein by reference, toner processes wherein cleavable surfactants of Formulas (I), (II), (III), or mixtures thereof can be selected. The cleavable surfactants of the present invention can be selected for the toner processes of the U.S. Pat. No. 5,766,818.

BACKGROUND OF THE INVENTION

The present invention is generally directed to surfactants, and more specifically, to nonionic surfactant compositions comprising a hydrophobic group and a hydrophilic group linked by a phosphate ester, and processes thereof, and which nonionic surfactant compositions can be cleaved or converted into a substantially inert form by exposure to, for example, basic mediums, or basic solutions, and wherein the pH thereof is, for example, from about 8 to about 13, and preferably from about 8 to about 12. The nonionic surfactant compositions can be utilized for the preparation of toners by emulsion/aggregation/coalescence processes as illustrated in U.S. Pat. No. 5,766,818, entitled "Toner Processes", filed concurrently herewith, U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also U.S. Pat. Nos. 5,348,832; 5,405,728; 5,366,841; 5,496,676; 5,527,658; 5,585,215; 5,650,255; 5,650,256 and 5,501,935 (spherical toners), the disclosures of which are totally incorporated herein by reference.

PRIOR ART

A number of surfactants, such as nonionic surfactants, are known. Usually, these surfactants are stable in acid, basic and neutral media. In some applications, however, it is necessary or at least highly desirable to modify or change the surface activity of a surfactant in toner processes, and in these process situations the presence of the surfactant after its use, such as the emulsion/aggregation toner processes of the appropriated U.S. patents recited herein, can result in toner products with undesirable characteristics. For example, in the processes for the preparation of toners, as illustrated in U.S. Pat. Nos. 4,996,127 and 4,983,488, the disclosures of which are totally incorporated herein by reference, the nonionic surfactants are preferably removed from the toner generated because their presence may significantly adversely affect the toner charging, such as triboelectric charging characteristics. To remove such surfactants, however, requires lengthy and numerous washing processes which are costly, time-consuming, and generate large volumes of waste water. In addition, this type of nonionic surfactants is not easily biodegradable rendering such surfactants upon disposal a possible, or potential source of water pollution. One of the features of the present invention, therefore, is to provide nonionic surfactant compositions which are suitable for use in emulsion/aggregation/coalescence toner processes and which surfactants can be readily destroyed or changed by treatment with an aqueous basic solution into water soluble components for simple washing thereof and removal from the toner generated.

In U.S. Pat. Nos. 4,072,704 and 4,353,834, there are disclosed carbonate and carboxylic acid ester group containing nonionic surfactants. There is no indication in these patents, however, that, for example, phosphate ester linkages are present, and also, these types of surfactants are not believed to be as suitable for the preparation of toners. These prior art surfactants are sensitive to acid conditions and break down, or decompose in acidic media, thus rendering them unuseful for emulsion polymerizations which is generally conducted under acidic conditions. The phosphate based surfactants of the present invention are relatively stable, that is they do not decompose, in acidic media and therefore be utilized in emulsion polymerizations. The low stability of the phosphate based surfactants in basic media renders the latexes prepared with these surfactants ideally suited for the preparation of toners of the present invention since they can be readily hydrolyzed or broken down by, for example, a base compound after toner preparation, thus enabling a chemical toner process with minimum or no post-reaction washing.

SUMMARY OF THE INVENTION

It is a feature of the present invention to provide nonionic surfactant compositions with many of the advantages illustrated herein.

In another feature of the present invention there are provided surfactant compositions which are cleavable by exposure to, or mixing with, for example, a basic medium, which promotes hydrolytic cleavage of the surfactant molecules.

Further, in a feature of the present invention there are provided nonionic surfactant compositions comprised of a hydrophobic group and a hydrophilic group linked by a phosphate ester linkage.

Yet in another feature of the present invention there are provided nonionic surfactant compositions comprised of phosphate ester-linked hydrophilic chains, and which chains are, for example, selected from the group consisting of polyoxyalkylene glycols, poly(vinyl alcohols), poly(saccharides) and the like, and which chain polymers contain at least one terminal hydrophobic group comprised of, for example, alkyl, alkylaryl, arylalkyl, or alkylarylalkyl.

In an associated feature of the present invention there are provided processes for the preparation of nonionic surfactant compositions.

In embodiments, the present invention relates to nonionic surfactant compositions of Formulas (I), (II), or (III), or mixtures thereof (I)

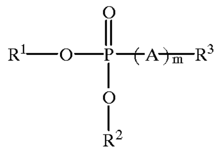

(II)

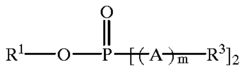

-continued (III)

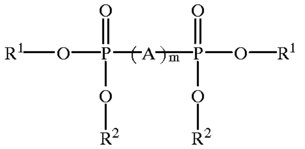

wherein $R^1$ is a hydrophobic moiety selected from, for example, the group consisting of alkyl, aryl, and their substituted derivatives, such as those containing a halogen atom such as fluorine, chlorine or bromine, and wherein the alkyl group contains, for example, from about 4 to about 60, and preferably from about 6 to about 30 carbon atoms and the aryl group contains, for example, from about 6 to about 60, and preferably from about 10 to about 30 carbon atoms; $R^2$ may be the same as $R^1$ or different, and can be selected from the group consisting of alkyl, aryl, and their substituted derivatives; $R^3$ is hydrogen or alkyl of from, for example, about 1 to about 10, and preferably 1 to 3 carbon atoms; A is a hydrophilic polymer chain selected, for example, from the group consisting of polyoxyalkylene, poly(vinyl alcohols), poly(saccharides) and the like, and preferably is a polyoxyalkylene derived from the same or different alkylene oxides with from about 2 to about 4 carbon atoms; and m is the number of repeating units of the hydrophilic polymer chain, and can be a number of, for example, from about 2 to about 500, and preferably from about 5 to about 100.

In embodiments the present invention relates to the provision of nonionic surfactant compositions of Formulas (I), (II), (III), or mixtures thereof, wherein the total of components in the mixture is equal to about 100 percent, and which surfactants are comprised of a hydrophobic and a hydrophilic moiety linked together by a phosphate ester linkage. With the presence of the phosphate ester linkage, the surfactant compositions of the present invention can, for example, be decomposed, or converted into non-surface-active species or into new surface-active derivatives with different molecular properties upon exposure to conditions of, for example, basic medium which promote hydrolytic cleavage of the surfactant molecules. The nonionic surfactant compositions illustrated herein can be selected for known emulsion/aggregation/coalescense processes for the preparation of chemical toners, and wherein the nonionic surfactant compositions can be readily decomposed by treatment with a dilute aqueous base solution into water soluble components, which components can be removed from the toner generated by a limited number of washings, thus enabling the provision of toners with excellent charging characteristics.

This invention relates to a surfactant composition represented by Formulas (I), (II) or (III); or optionally mixtures thereof (I)

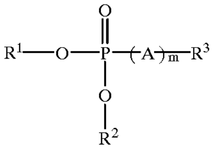

-continued (II)

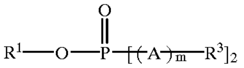

(III)

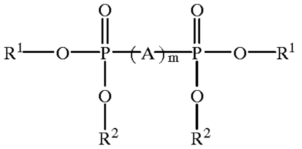

wherein $R^1$ is a hydrophobic moiety such as an aliphatic or aromatic group like alkyl or aryl; $R^2$ is selected from the group consisting of alkyl and aryl; $R^3$ is hydrogen or alkyl; A is a hydrophilic polymer chain; and m is the number of repeating segments of the hydrophilic polymer chain A; a surfactant wherein $R^1$ alkyl contains from about 4 to about 60 carbon atoms, $R^1$ aryl contains from about 6 to about 60 carbon atoms; $R^2$ alkyl contains from 1 to about 60 carbon atoms, $R^2$ aryl contains from about 6 to about 60 carbon atoms; $R^3$ alkyl contains from 1 to about 10 carbon atoms; and m is a number of from about 2 to about 500; a surfactant composition wherein A is selected from the group consisting of polyoxyalkylene, poly(vinyl alcohols), and poly (saccharides), wherein each hydrophilic polymer can be formed as block, branched, copolymeric, or homopolymeric polymers; a surfactant composition wherein A is a hydrophilic polyoxyalkylene chain derived from the same or different alkylene oxides with from about 2 to about 4 carbon atoms; a surfactant composition wherein $R^1$ is an alkylaryl, and wherein alkyl contains from about 4 to about 30 carbon atoms and aryl contains from about 6 to about 10 carbon atoms; $R^2$ is an alkyl containing from 1 to about 30 carbon atoms or an aryl containing from about 6 to about 10 carbon atoms; $R^3$ is hydrogen or alkyl of from 1 to about 5 carbon atoms; and wherein A is a hydrophilic polymer chain with the number of repeating segments m being from about 5 to about 100; a surfactant composition wherein said alkylaryl is an alkylphenyl; a surfactant composition wherein $R^2$ is an alkyl group; a surfactant composition wherein said alkyl group contains 1 to about 6 carbon atoms; a surfactant composition wherein said alkyl group is methyl; a nonionic surfactant composition wherein $R^3$ is hydrogen or methyl; a surfactant composition wherein A is a poly (ethylene glycol) chain with the number of repeating units m being from about 5 to about 100; a surfactant composition wherein $R^1$ or $R^2$ contains a substituent selected from the group consisting of fluorine, chlorine, and bromine; a surfactant composition wherein $R^1$ is an alkylphenyl group wherein alkyl contains from about 4 to about 30 carbon atoms, $R^2$ is an alkyl group with 1 to about 6 carbon atoms, and $R^3$ is hydrogen or methyl, and wherein A is a poly (ethylene glycol) chain with the number of repeating units m being from about 5 to about 100; a process for the preparation of nonionic surfactant compositions of Formula (I) comprising, it being noted that the amounts of reactants and the like can be other than what is specifically recited and outside the ranges indicated, (A) reacting from about 1 to about 5 molar equivalents of a phosphorus oxyhalide with about 1 molar equivalent of a hydroxylic component $R^1OH$ (IV) at a temperature ranging from about 5° C. to about 120° C. to provide a dihalophosphate (VII)

(VII)

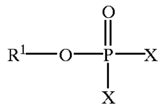

wherein $R^1$ is an alkyl or aryl, and X is a halide;

(B) reacting about 1 molar equivalent of a dihalophosphate (VII) with about 1 molar equivalent of an hydroxylic component $R^2OH$ (V) at a temperature ranging from about 0° C. to about 80° C. in an inert solvent and in the presence of a base to provide a halophosphate (VIII)

(VIII)

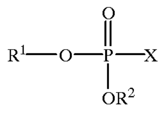

wherein $R^1$ and $R^2$ are an alkyl or aryl, and X is a halide;

(C) reacting about 1 molar equivalent of a halophosphate (VIII) with about 1 molar equivalent of a hydrophilic polymer (VI) at a temperature ranging from 0° C. to about 80° C. in an inert solvent, and in the presence of a base (VI)

$$HO-(A)_m-R^3$$

wherein $R^3$ is an alkyl, A is a hydrophilic polymer chain with m representing the number of repeating segments; or comprising (A) reacting from about 1 to about 5 molar equivalents of a phosphorus oxyhalide with about 1 molar equivalent of a hydroxylic component (IV) $R^1OH$ at a temperature ranging from 5° C. to about 120° C. to provide a dihalophosphate (VII)

(VII)

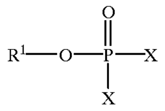

wherein $R^1$ is an alkyl or aryl, and X is a halide;

(B) reacting about 1 molar equivalent of a dihalophosphate (VII) of (A) with about 1 molar equivalent of a hydrophilic polymer (VI) at a temperature ranging from about 0° C. to about 80° C. in an inert solvent, and in the presence of a base to provide a halophosphate (IX)

(VI)

$$HO-(A)_m-R^3$$

(IX)

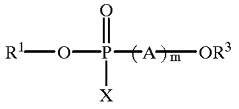

wherein $R^1$ is an alkyl or aryl, $R^3$ is an alkyl, X is a halide, and A is a hydrophilic polymer chain with m representing the number of repeating segments; and (C) reacting 1 molar equivalent of a halophosphate (IX) of (B) with about 1 molar equivalent of a hydroxylic component $R^2OH$ (V) at a temperature ranging from about 0° C. to about 80° C. in an inert solvent, and in the presence of a base; a process for the preparation of nonionic surfactant compositions of Formula (II) comprising (A) reacting about 1 to about 5 molar equivalents of a phosphorus oxyhalide with about 1 molar equivalent of a hydroxylic component (IV) at a temperature ranging from about 5° C. to about 120° C. to provide a dihalophosphate (VII)

(VII)

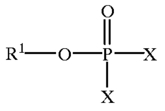

wherein $R^1$ is an alkyl or aryl, and X is a halide; and (B) reacting about 1 molar equivalent of a dihalophosphate (VII) as prepared in (A) with about 2 molar equivalents of a hydrophilic polymer component (VI) at a temperature ranging from about 0° C. to about 80° C. in an inert solvent, and in the presence of a base (VI)

$$HO-(A)_m-R^3$$

wherein $R^3$ is an alkyl, and A is a hydrophilic polymer chain with m representing the number of repeating segments; a process for the preparation of nonionic surfactant compositions of Formula (III) comprising (A) reacting from about 1 to about 5 molar equivalents of a phosphorus oxyhalide with about 1 molar equivalent of a hydroxylic component (IV) $R^1OH$ at a temperature ranging from about 5° C. to about 120° C. to provide a dihalophosphate (VII)

(VII)

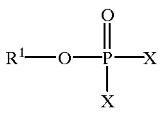

wherein $R^1$ is an alkyl or aryl, and X is a halide;

(B) reacting 1 molar equivalent of a dihalophosphate (VII) of (A) with from about 1 molar equivalent of a hydroxylic component $R^2OH$ (V) at a temperature ranging from about 0° C. to about 80° C. in an inert solvent, and in the presence of a base to provide a halophosphate (VIII)

(VIII)

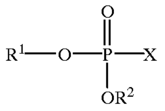

wherein $R^1$ and $R^2$ are an alkyl or aryl, X is a halide; and (C) reacting about 2 molar equivalents of a halophosphate (VIII) of (B) with 1 molar equivalent of a hydroxylic component (X) at a temperature ranging from 0° C. to about 80° C. in an inert solvent, and in the presence of a base (X)

$$HO-(A)_m-OH$$

wherein A is a hydrophilic polymer chain with m representing the number of repeating segments; a process wherein (A) further comprises from 0.5 to about 5 molar percent of a metal catalyst; a process wherein said metal catalyst is magnesium chloride; a process wherein (A) further comprises from about 1 to about 3 molar percent of a metal catalyst; a process wherein said metal catalyst is magnesium halide; a process wherein said inert solvent is a hydrocarbon or a halogenated hydrocarbon, and wherein said base is a tertiary amine; a process wherein said inert solvent is a hydrocarbon or a halogenated hydrocarbon; and wherein said base is a tertiary amine; a surfactant composition wherein said surfactant is selected from the group consisting of poly(ethylene glycol) methyl p-tert-octylphenyl phosphate, poly(ethylene glycol)-α-methyl ether-ω-methyl p-tert-octylphenyl phosphate, poly(ethylene glycol) methyl decylphenyl phosphate, poly(ethylene glycol)-α-methyl ether-ω-methyl dodecylphenyl phosphate, poly (ethyleneglycol) methyl dodecylphenyl phosphate, bis[poly (ethylene glycol)-α-methyl ether]-ω-p-tert-octylphenyl phosphate, poly(ethylene glycol)-α,ω-methyl p-tert-octylphenyl phosphate, poly(ethylene glycol) ethyl p-tert-octylphenyl phosphate, poly(ethylene glycol)-α-methyl ether-ω-ethyl p-tert-octylphenyl phosphate, poly(ethylene glycol) phenyl p-tert-octylphenyl phosphate, poly(ethylene glycol)-α-methyl ether-ω-phenyl p-tert-octylphenyl phosphate, poly(ethylene glycol) tolyl p-tert-octylphenyl phosphate, poly(ethylene glycol)-α-methyl ether-ω-tolyl p-tert-octylphenyl phosphate, and poly(ethylene oxide-co-propylene oxide) methyl p-tert-octylphenyl phosphate, and wherein the polymer chain contains, for example, from about 5 to about 50 repeating units or segments; a surfactant composition wherein said surfactant is selected from the group consisting of poly(ethylene glycol) methyl p-tert-octylphenyl phosphate, poly(ethylene glycol)-α-methyl ether-ω-methyl p-tert-octylphenyl phosphate, poly(ethylene glycol) methyl decylphenyl phosphate, poly(ethylene glycol)-α-methyl ether-ω-methyl dodecylphenyl phosphate, poly(ethylene glycol) methyl dodecylphenyl phosphate, bis [poly(ethylene glycol)-α-methyl ether]-ω-p-tert-octylphenyl phosphate, and poly(ethylene glycol)-α,ω-methyl p-tert-octylphenyl phosphate; a surfactant composition represented by Formulas (I), (II) or (III)

(I)

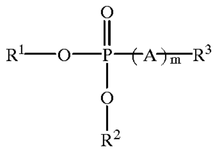

(II)

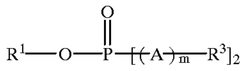

-continued (III)

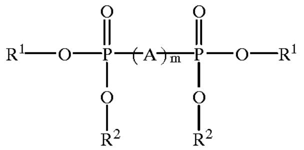

wherein $R^1$ is a hydrophobic segment; $R^2$ is selected from the group consisting of alkyl and aryl; $R^3$ is hydrogen or alkyl; A is a hydrophilic polymer chain; and m is the number of repeating segments of the hydrophilic polymer chain A.

DESCRIPTION OF THE PREFERRED EMBODIMENTS

In embodiments, the nonionic surfactant compositions of the present invention comprise a hydrophobic group and a hydrophilic group linked by a phosphate ester linkage. The preferred nonionic surfactant compositions of the present invention are illustrated by Formulas (I) through (III).

Examples of $R^1$ include a) alkyl with from about 4 about 60, and preferably from about 6 to about 30 carbon atoms, such as butyl, heptyl, hexyl, octyl, tert-octyl, decyl, dodecyl, isododecyl, tetradecyl, octadecyl, eicosyl, triacontyl, and the like. The alkyl group may contain a halogen substituent such as fluorine, chlorine, iodine, or bromine. Illustrative examples of halogenated alkyls are fluorohexyl, fluorooctyl, perfluorooctyl, fluorodecyl, fluorododecyl, chlorooctyl, chlorododecyl, and the like. $R^1$ also includes alkylaryl groups, such as octylbenzyl, tert-octylbenzyl, decylbenzyl, dodecylbenzyl, octylphenethyl, and the like. Similarly, the alkylaryl group may contain a substituent of a halogen atom such as fluorine, chlorine, or bromine. Examples of halogenated alkylarylalkyl are octylfluorobenzyl, tert-octylfluorobenzyl fluorooctylbenzyl, chlorooctylbenzyl, perfluorohexylbenzyl, dodecylchlorophenyl, octylchlorophenethyl, fluorododecylphenethyl, and the like; and b) aryl or substituted aryl with one or more alkyl substituent containing from about 4 to about 60 carbon atoms, preferably from about 6 to about 30 carbon atoms. Illustrative examples are phenyl, naphthyl, hexylphenyl, octylphenyl, tert-octylphenyl, decylphenyl, dodecylphenyl, tetradecylphenyl, octyltolyl, dodecylxylyl, dodecyinaphthyl, and the like. The substituted aryl may additionally contain a halogen substituent such as fluorine, iodine, chlorine, or bromine. Illustrative examples include, fluorooctylphenyl, chlorooctylphenyl, perfluorodecylphenyl, tert-octylfluorophenyl, dodecylchlorophenyl, and the like.

Typically, the group selected for $R^2$ may be the same as $R^1$ or different. $R^2$, more specifically, is selected from the group consisting of alkyl containing from 1 to about 60 carbon atoms, and preferably from 1 to about 30 carbon atoms, and aryl containing from about 6 to about 60, and more preferably from 6 to about 30 carbon atoms, and their substituted derivatives such as those aryls containing a halogen atom such as fluorine, chlorine, or bromine.

$R^3$ is, for example, hydrogen or an alkyl of from 1 to about 10 carbon atoms, and preferably hydrogen or methyl.

In embodiments, A is comprised of any suitable hydrophilic polymer chain, and which suitable polymer is available from Aldrich Chemicals. Specific examples of suitable hydrophilic polymer chains can be selected, for example, from the group consisting of polyoxyalkylene, poly(vinyl alcohols), poly(saccharides) and the like, and their derivatives, wherein each hydrophilic polymer chain may be formed with block, branched, copolymeric, or homopolymeric polymer chains. Preferred hydrophilic polymer chains selected for A are polyoxyalkylene derived from the same or different alkylene oxides with 2 to about 4 carbon atoms, such as poly(oxyalkylene glycols) like poly(ethylene glycol), poly(propylene glycol), poly(ethylene oxide-propylene oxide), poly(ethylene glycol)-b-poly(propylene glycol), and the like. The hydrophilic polymer chain A may have a number of repeating units m of, for example, from about 2 to about 500, and preferably from about 5 to about 100.

In preferred embodiments, the nonionic surfactant compositions represented by Formulas (I) through (III) comprise a hydrophobic group of $R^1$ comprised of an alkylaryl group wherein alkyl contains about 6 to about 30 carbon atoms, a hydrophilic chain of A derived from polyoxyalkylene of, for example, poly(ethylene glycol) with the number of repeating segments being of from about 5 to about 100. Preferably, $R^2$ is an alkyl group with 1 to about 10, and preferably 1 to about 5 carbon atoms, and $R^3$ is hydrogen or methyl.

Illustrative examples of the nonionic surfactants include poly(ethylene glycol) methyl p-tert-octylphenyl phosphate, poly(ethylene glycol)-α-methyl ether-ω-methyl p-tert-octylphenyl phosphate, poly(ethylene glycol) methyl decylphenyl phosphate, poly(ethylene glycol)-α-methyl ether-ω-methyl dodecylphenyl phosphate, poly(ethylene glycol) methyl dodecylphenyl phosphate, bis[poly(ethylene glycol)-α-methyl ether]-ω-p-tert-octylphenyl phosphate, poly(ethylene glycol)-α,ω-methyl p-tert-octylphenyl phosphate, poly(ethylene glycol) ethyl p-tert-octylphenyl phosphate, poly( ethylene glycol )-α-methyl ether-ω-ethyl p-tert-octylphenyl phosphate, poly(ethylene glycol) phenyl p-tert-octylphenyl phosphate, poly(ethylene glycol)-α-methyl ether-ω-phenyl p-tert-octylphenyl phosphate, poly (ethylene glycol) tolyl p-tert-octylphenyl phosphate, poly (ethylene glycol)-α-methyl ether-ω-tolyl p-tert-octylphenyl phosphate, poly(ethylene oxide-co-propylene oxide) methyl p-tert-octylphenyl phosphate, and the like, wherein the polymer chains contain, for example, from about 5 to about 50 repeating units or segments.

The nonionic surfactant compositions of the present invention can be formed by the stepwise esterification of a phosphorus oxyhalide with hydroxylic components (a component containing a hydroxy group) as illustrated in the following reaction scheme.

Scheme 1

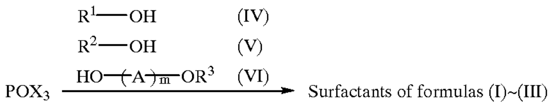

wherein X is a halide such as chloride or bromide, $R^1$ is an alkyl of, for example, from about 4 to about 60 carbon atoms, or an aryl group having from about 6 to about 60 carbon atoms; $R^2$ may be the same as $R^1$ or different, and can be selected from the group consisting of alkyl of 1 to about 60 carbon atoms, and aryl having from about 6 to about 60 carbon atoms; $R^3$ is hydrogen or alkyl of from, for example, about 1 to 10, and preferably 1 to 3 carbon atoms; A is a hydrophilic polymer chain selected from the group consisting of polyoxyalkylene, poly(vinyl alcohols), poly (saccharides) and the like, and preferably is a polyoxyalkylene. The esterification processes illustrated herein can be accomplished by a number of different processes. A process for the preparation of nonionic surfactant composition of Formula (I) comprises (A) reacting from about 1 to about 5 molar equivalents of a phosphorus oxyhalide with about 1 molar equivalent of a hydroxylic component $R^1$—OH (IV) of, for example, an alkylphenol to provide a dihalophosphate (VII)

(VII)

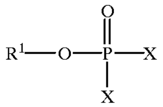

wherein X is a halide, and $R^1$ is an alkyl or an aryl as indicated herein;

(B) reacting about 1 molar equivalent of the resulting dihalophosphate (VII) with about 1 molar equivalent of an hydroxylic component (V) of, for example, methanol, or a hydrophilic polymer (VI) of, for example, poly(ethylene glycol), in the presence of a base, such as a tertiary amine of, for example, pyridine and other known suitable bases to provide a halophosphate (VIII) and (IX), respectively (VIII)

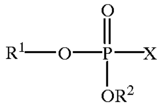

(IX)

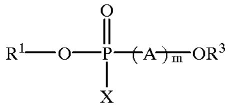

wherein X is a halide, $R^1$ and $R^2$ are an alkyl or an aryl, $R^3$ is a hydrogen or an alkyl, and A is a polymer chain as indicated herein; and (C) then reacting about 1 molar equivalent of a halophosphate (VIII) with a hydrophilic polymer (VI) in the presence of about one molar equivalent of base to yield the surfactant of Formula (I). Alternatively, the surfactant of Formula (I) can also be prepared by reacting about 1 molar equivalent of a halophosphate (IX) with 1 molar equivalent of the hydroxylic component (V) in the presence of about 1 molar equivalent of base.

Examples of phosphorus oxyhalides for (A) are phosphorus oxychloride or phosphorus oxybromide. The process (A) is accomplished by heating the suitable reactants at a temperature ranging, for example, from about 5° C. to about 120° C., and preferably from about 23° C. to about 110° C. The reaction can further be accelerated in the presence of, for example, from 1 to about 10 molar percent of a metal catalyst. Examples of metal catalysts include magnesium chloride, magnesium bromide, iron powder, potassium chloride, and the like. The dihalophosphate (VII) can be obtained by distilling off the unreacted phosphorus oxyhalide.

The esterification processes in processes (B) and (C) can be accomplished in an inert solvent at a temperature ranging from about 0° C. to about 80° C. and preferably from 5° C. to 45° C. Any suitable inert solvent may be selected, including hydrocarbons such as benzene, toluene, or xylene, halogenated hydrocarbons such as dichloromethane, chloroform, 1,2-dichloroethane, and the like. Preferably, the esterification reactions are accomplished in the presence of from about 1 to about 5 equivalents of a base. Any base capable of neutralizing the hydrogen halide generated in situ may be employed for this purpose. Useful bases include tertiary amines, alkaline metal hydroxides such as sodium hydroxide and potassium hydroxide, and alkaline metal alkoxides such as sodium methoxide and sodium ethoxide. Preferred bases are tertiary amine compounds, such as pyridine, quinoline, trimethylamine, triethylamine, and the like.

In another embodiment, the surfactants of Formula (II) are prepared from the esterification of 1 molar equivalent of dihalophosphate (VII) with about two molar equivalents of a hydrophilic polymer (VI) of, for example, a poly(ethylene glycol) in the presence of about two molar equivalents of a base. These esterification processes can be accomplished in an inert solvent at a temperature ranging from about 0° C. to about 80° C. and preferably from about 5° C. to about 45° C.

The surfactants of Formula (III) are similarly prepared by reacting about two molar equivalents of monohalophosphate (VIII) with about one molar equivalent of a hydrophilic polymer (X) of, for example, a poly(ethylene glycol). The esterification process can be accomplished in an inert solvent at a temperature ranging from about 0° C. to about 80° C., and preferably from about 5° C. to about 45° C. in the presence of a suitable base (X)

$$HO-(A)_m-OH$$

wherein A is a hydrophilic polymer chain of, for example, a poly(ethylene glycol) with the number of repeating segments m being selected from about 5 to about 50.

The surfactant compositions of Formulas (I) through (III) may be further purified by known methods, such as filtration, or washing with suitable solvents, such as water. The structure and formulas of the surfactants are confirmed by analytical techniques such as NMR.

Processes for the preparation of the nonionic surfactant compositions of Formulas (I) through (III) can comprise the stepwise esterification of a phosphorus oxyhalide of, for example, phosphorus oxychloride with suitable hydroxylic components $R^1OH$ (IV) or $R^2OH$ (V), and a hydrophilic polymer of Formulas (VI) or (X) containing at least one hydroxy group. Specific examples of $R^1OH$ (IV) include tert-octylphenol, decylphenol, dodecylphenol, hexadecylphenol, tert-octylfluorophenol, decanol, tridecanol, and the like. Illustrative examples of $R^2OH$ (V) are methanol, ethanol, propanol, phenol, octylphenol, dodecylphenol, and the like. Preferred examples of hydrophilic polymers are poly(ethylene glycols) with the number of repeating segments selected being from about 5 to about 50.

The nonionic surfactant compositions of the present invention may be utilized in many forms in various applications. For example, they may be used in combination with anionic surfactants, such as for example, sodium dodecylsulfate (SDS), sodium dodecylbenzene sulfonate, sodium dodecylnaphthalene sulfate, dialkyl benzenealkyl, sulfates and sulfonates, abietic acid, available from Aldrich, NEOGEN R™, NEOGEN SC™ obtained from Kao, with cationic surfactants such as, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, or mixtures thereof. The nonionic surfactant compositions can be selected for various latex preparative processes, emulsion polymerizations, colorant dispersion processes, and the like. Specifically, the nonionic surfactant compositions of the present invention may be selected for the toner processes which utilize aggregation and coalescence or fusion of the latex, colorant, such as pigment, dye, or mixtures thereof, and additive articles, as illustrated in the U.S. Pat. No. 5,766,818, the disclosure of which is totally incorporated herein by reference, and the patents recited therein.

The following Examples are being submitted to further define various pieces of the present invention. These Examples are intended to be illustrative only and are not intended to limit the scope of the present invention.

EXAMPLE I

Synthesis of Poly(ethylene glycol)methyl 4-tert-octylphenyl Phosphate (XI) Wherein m is About 40:

(XI)

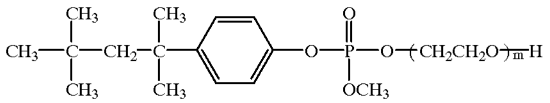

Preparation of 4-tert-octylphenyl dichlorophosphate:

In a 500 milliliter round bottomed flask equipped with a magnetic stirrer and fitted with a reflux condenser, which was connected to a magnesium sulfate dry tube, were placed 25.0 grams (0.121 mole) of 4-tert-octylphenol, 57 grams (0.372 mole) of phosphorus oxychloride, and 0.35 gram (0.0036 mole) of magnesium chloride. The reaction mixture resulting was then heated to a reflux temperature of 110° C. and maintained at this temperature for 6 hours. The unreacted phosphorus oxychloride was distilled off and the reaction mixture was cooled to room temperature, about 25° C., to provide an oily mixture which contains 39.8 grams of 4-tert-octylphenyl dichlorophosphate.

In a 3 liter round bottomed flask equipped with a mechanical stirrer and fitted with a 100 milliliter addition funnel was added the 4-tert-octylphenyl dichlorophosphate as prepared above and 250 milliliters of anhydrous toluene, while in the addition funnel were placed 3.9 grams (0.121 mol) of methanol and 9.6 grams (0.121 mol) of pyridine. The flask was cooled with an ice bath and the mixture of methanol and pyridine was added through the addition funnel over a period of 0.5 hour. After the addition, the reaction mixture was stirred for additional 1.0 hour. Into this mixture was added a solution of 182 grams of poly(ethylene glycol) obtained from Aldrich Chemicals and with an average molecular weight $M_w$ of 1,500, in 500 milliliters of anhydrous toluene, and then followed by the addition of 9.6 grams of pyridine. After stirring for 0.5 hour, the ice bath was removed, and the reaction mixture was stirred for 12 hours. The precipitated pyridine hydrochloride solids were filtered off and the liquid mixture was concentrated by distilling the volatile materials to yield 195 grams of a waxy solid. The surfactant composition product (XI) was characterized by proton NMR. The chemical shifts in $CDCl_3$ are: 0.7 (s), 1.36 (s), 1.72 (s), 3.66 (m, PEG backbone), 3.84 (d), 4.27 (m), 7.12 (d), 7.31 (d).

EXAMPLE II

Synthesis of Poly(ethylene glycol) α-methyl Ether ω-methyl 4-tert-octylphenyl Phosphate (XII) Wherein m is About 17:

(XII)

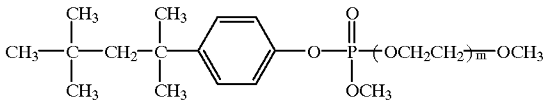

In a one liter round bottomed flask equipped with a magnetic stirrer and fitted with a reflux condenser, which condenser was connected to a magnesium sulfate dry tube, were placed 250 milliliters of anhydrous toluene and 100 grams of poly(ethyleneglycol) monomethyl ether with an average molecular weight of 750. The flask was cooled with an ice bath, and to the stirred mixture there were added 45 grams (0.139 mol) of 4-tert-octylphenyl dichlorophosphate and 11.0 grams (0.139 mol) of pyridine. After 0.5 hour, the ice bath was removed and the reaction mixture was stirred at room temperature for 5.0 hours. The reaction was completed by adding 20 milliliters of methanol and 11.0 grams of pyridine, and the stirring was maintained for another 3.0 hours. The precipitated pyridine hydrochloride solids were removed by filtration, and the filtrate was concentrated under reduced pressure to yield 125 grams of a liquid. The surfactant composition product (XII) was characterized by proton NMR. The chemical shifts in $CDCl_3$ are: 0.7 (s), 1.36 (s), 1.71 (s), 3.38 (s), 3.66 (m, PEG backbone), 3.85 (d), 4.27 (m), 7.12 (d), 7.34 (d).

EXAMPLE III

Synthesis of Bis[poly(ethylene glycol)] α-methyl Ether ω-methyl 4-tert-octylphenyl Phosphate (XIII) Wherein m is About 17:

(XIII)

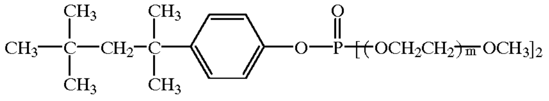

In a one liter round bottomed flask equipped with a magnetic stirrer and fitted with a reflux condenser, which was connected to a magnesium sulfate dry tube, were placed 150 milliliters of anhydrous toluene and 110 grams of poly(ethyleneglycol)monomethyl ether with an average molecular weight of 750. The flask was cooled with an ice bath, and to the stirred mixture there were added 22.6 grams (0.07 mol) of 4-tert-octylphenyl dichlorophosphate and 11.0 grams (0.139 mol) of pyridine. After 0.5 hour, the ice bath was removed and the reaction mixture was stirred at room temperature for 5.0 hours. The precipitated pyridine hydrochloride solids were removed by filtration, and the liquid filtrate was concentrated under reduced pressure to yield 118 grams of a waxy solid. The surfactant composition product (XIII) was characterized by proton NMR. The chemical shifts in $CDCl_3$ are: 0.7 (s), 1.36 (s), 1.70 (s), 3.39 (s), 3.66 (m, PEG backbone), 4.27 (m), 7.10 (d), 7.35 (d).

EXAMPLE IV

Synthesis of Bis[poly(ethylene glycol)] α-methyl Ether ω-methyl 4-tert-octylphenyl Phosphate (XIII) Wherein m is About 40:

(XIV)

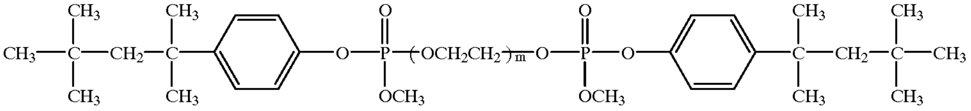

In a 3 liter round bottomed flask equipped with a mechanical stirrer and fitted with a 100 milliliter addition funnel was added the 4-tert-octylphenyl dichlorophosphate as prepared above and 250 milliliters of anhydrous toluene, while in the addition funnel were placed 3.9 grams (0.121 mol) of methanol and 9.6 grams (0.121 mol) of pyridine. The flask was cooled with an ice bath and the mixture of methanol and pyridine was added through the addition funnel over a period of 0.5 hour. After the addition, the reaction mixture was stirred for an additional 1.0 hour. Into this mixture was added a solution of 90 grams of poly(ethylene glycol) with an average molecular weight of 1,500 in 500 milliliters of anhydrous toluene and there followed by 20 grams of pyridine. After stirring for 0.5 hour, the ice bath was removed, and the reaction mixture was stirred for 12.0 hours. The precipitated pyridine hydrochloride solids were filtered off and the liquid mixture remaining was concentrated by distilling the volatile materials to yield 115 grams of a liquid. The surfactant composition product (XIV) was characterized by proton NMR. The chemical shifts in $CDCl_3$ are: 0.71 (s), 1.37 (s), 1.72 (s), 3.67 (m, PEG backbone), 3.85 (d), 4.27 (m), 7.12 (d), 7.32 (d).

EXAMPLES V AND VI

Examples II and III were repeated substituting, respectively, a poly(ethylene glycol) monomethyl ether with an average molecular weight of 2,000 for the poly(ethylene glycol) monomethyl ether of Examples II and III. There were obtained nonionic surfactants (XV) and (XVI) whose structures are represented by Formulas (XII) and (XIII), wherein m is about 45, respectively. The chemical shifts of surfactant (XV) in $CDCl_3$ are: 0.7 (s), 1.35 (s), 1.71 (s), 3.37 (s), 3.67 (m, PEG backbone), 3.84 (d), 4.27 (m), 7.12 (d), 7.33 (d). The chemical shifts of surfactant (XVI) in $CDCl_3$ are: 0.69 (s), 1.36 (s), 1.70 (s), 3.40 (s), 3.66 (m, PEG backbone), 4.26 (m), 7.10 (d), 7.34 (d).

EXAMPLE VII

Example II was repeated substituting dodecylphenol for the 4-tert-octylphenol of Example II, resulting in the surfactant (XVII) wherein m is about 17.

(XVII)

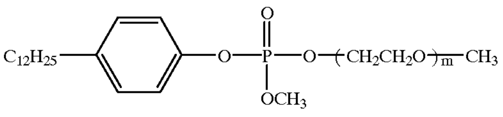

The chemical shifts of surfactant (XVII) in $CDCl_3$ are: 0.85 (t), 1.30 (m), 2.51(t), 3.38 (s), 3.66 (m, PEG backbone), 3.85 (d), 4.27 (m), 7.10 (d), 7.34 (d).

Other modifications of the present invention may occur to those skilled in the art subsequent to a review of the present application and these modifications, including equivalents thereof, are intended to be included within the scope of the present invention.

What is claimed is:

1. A process for the preparation of nonionic surfactant compositions of Formula (I)

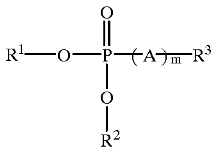

wherein $R^1$ is a hydrophobic moiety of alkyl or aryl; $R^2$ is selected from the group consisting of hydrogen, alkyl and aryl; $R^3$ is hydrogen or alkyl; A is a hydrophilic polymer chain; and m is the number of repeating segments of the hydrophilic polymer chain A comprising:

(A) reacting from about 1 to about 5 molar equivalents of a phosphorus oxyhalide with about 1 molar equivalent of a hydroxylic component $R^1OH$ (IV) at a temperature ranging from about 5° C. to about 120° C. to provide a dihalophosphate (VII)

(VII)

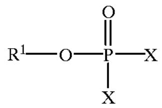

wherein $R^1$ is an alkyl or aryl, and X is a halide;

(B) reacting about 1 molar equivalent of a dihalophosphate (VII) with about 1 molar equivalent of an hydroxylic component $R^2OH$ (V) at a temperature ranging from about 0° C. to about 80° C. in an inert solvent and in the presence of a base to provide a halophosphate (VIII)

(VIII)

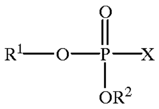

wherein $R^1$ and $R^2$ are an alkyl or aryl, and X is a halide;

(C) reacting about 1 molar equivalent of a halophosphate (VIII) with about 1 molar equivalent of a hydrophilic polymer (VI) at a temperature ranging from 0° C. to about 80° C. in an inert solvent, and in the presence of a base (VI)

$$HO{-}(A)_m{-}R^3$$

wherein $R^3$ is an alkyl, A is a hydrophilic polymer chain with m representing the number of repeating segments; or comprising (A) reacting from about 1 to about 5 molar equivalents of a phosphorus oxyhalide with about 1 molar equivalent of a hydroxylic component (IV) $R^1OH$ at a temperature ranging from 5° C. to about 120° C. to provide a dihalophosphate (VII)

(VII)

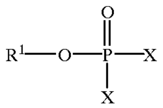

wherein $R^1$ is an alkyl or aryl, and X is a halide;

(B) reacting about 1 molar equivalent of a dihalophosphate (VII) of (A) with about 1 molar equivalent of a hydrophilic polymer (VI) at a temperature ranging from about 0° C. to about 80° C. in an inert solvent, and in the presence of a base to provide a halophosphate (IX)

(VI)

$$HO{-}(A)_m{-}R^3$$

(IX)

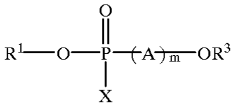

wherein $R^1$ is an alkyl or aryl, $R^3$ is an alkyl, X is a halide, and A is a hydrophilic polymer chain with m representing the number of repeating segments; and (C) reacting 1 molar equivalent of a halophosphate (IX) of (B) with about 1 molar equivalent of a hydroxylic component $R^2OH$ (V) at a temperature ranging from about 0° C. to about 80° C. in an inert solvent, and in the presence of a base.

2. A process in accordance with claim 1 wherein (A) further comprises from 0.5 to about 5 molar percent of a metal catalyst.

3. A process in accordance with claim 2 wherein said metal catalyst is magnesium chloride.

4. A process in accordance with claim 1 wherein said inert solvent is a hydrocarbon or a halogenated hydrocarbon, and wherein said base is a tertiary amine.

5. A process for the preparation of nonionic surfactant compositions of Formula (III)

(III)

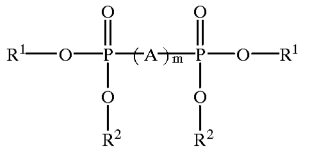

wherein $R^1$ is a hydrophobic moiety of alkyl or aryl; $R^2$ is selected from the group consisting of hydrogen, alkyl and aryl; A is a hydrophilic polymer chain; and m is the number of repeating segments of the hydrophilic polymer chain A comprising:

(A) reacting from about 1 to about 5 molar equivalents of a phosphorus oxyhalide with about 1 molar equivalent of a hydroxylic component (IV) $R^1OH$ at a temperature ranging from about 5° C. to about 120° C. to provide a dihalophosphate (VII)

(VII)

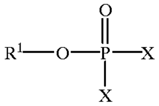

wherein $R^1$ is an alkyl or aryl, and X is a halide;

(B) reacting 1 molar equivalent of a dihalophosphate (VII) of (A) with from about 1 molar equivalent of a hydroxylic component $R^2OH$ (V) at a temperature ranging from about 0° C. to about 80° C. in an inert solvent, and in the presence of a base to provide a halophosphate (VIII)

(VIII)

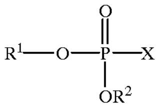

wherein $R^1$ and $R^2$ are an alkyl or aryl, X is a halide; and (C) reacting about 2 molar equivalents of a halophosphate (VIII) of (B) with 1 molar equivalent of a hydroxylic component (X) at a temperature ranging from 0° C. to about 80° C. in an inert solvent, and in the presence of a base $$HO-(A)_m-OH \quad (X)$$

wherein A is a hydrophilic polymer chain with m representing the number of repeating segments.

6. A process for the preparation of nonionic surfactant compositions of Formula (II)

(II)

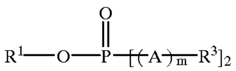

wherein $R^1$ is a hydrophobic moiety of alkyl or aryl; $R^3$ is hydrogen or alkyl; A is a hydrophilic polymer chain; and m is the number of repeating segments of the hydrophilic polymer chain A comprising;

(A) reacting about 1 to about 5 molar equivalents of a phosphorus oxyhalide with about 1 molar equivalent of a hydroxylic component (IV) of the formula $R^1OH$ at a temperature ranging from about 5° C. to about 120° C. to provide a dihalophosphate (VII)

(VII)

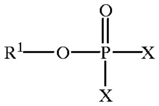

wherein $R^1$ is an alkyl or aryl, and X is a halide; and (B) reacting about 1 molar equivalent of a dihalophosphate (VII) as prepared in (A) with about 2 molar equivalents of a hydrophilic polymer component (VI) at a temperature ranging from about 0° C. to about 80° C. in an inert solvent, and in the presence of a base $$HO-(A)_m-R^3 \quad (VI)$$

wherein $R^3$ is an alkyl, and A is a hydrophilic polymer chain with m representing the number of repeating segments.

7. A process in accordance with claim 6 wherein (A) further comprises from about 0.5 to about 5 molar percent of a metal catalyst.

8. A process in accordance with claim 7 wherein said metal catalyst is magnesium chloride.

9. A process in accordance with claim 6 wherein said inert solvent is a hydrocarbon or a halogenated hydrocarbon; and wherein said base is a tertiary amine.

10. A surfactant composition represented by Formulas (I), (II); or optionally mixtures thereof (I)

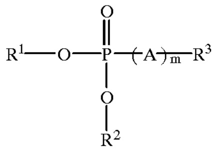

(II)

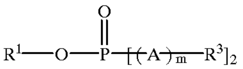

wherein $R^1$ is a hydrophobic moiety of alkyl or aryl; $R^2$ is selected from the group consisting of hydrogen, methyl and aryl; $R^3$ is hydrogen or methyl; A is a hydrophilic polymer chain; and m is the number of repeating segments of the hydrophilic polymer chain A.

11. A surfactant composition wherein said surfactant is selected from the group consisting of poly(ethylene glycol) methyl p-tert-octylphenyl phosphate, poly(ethylene glycol)-α-methyl ether-ω-methyl p-tert-octylphenyl phosphate, poly (ethylene glycol) methyl decylphenyl phosphate, poly (ethylene glycol)-α-methyl ether-ω-methyl dodecylphenyl phosphate, poly(ethyleneglycol) methyl dodecylphenyl phosphate, bis[poly(ethylene glycol)-α-methyl ether]-ω-p-tert-octylphenyl phosphate, poly(ethylene glycol)-α,ω-methyl p-tert-octylphenyl phosphate, poly(ethylene glycol) ethyl p-tert-octylphenyl phosphate, poly(ethylene glycol)-α-methyl ether-ω-ethyl p-tert-octylphenyl phosphate, poly (ethylene glycol) phenyl p-tert-octylphenyl phosphate, poly (ethylene glycol)-α-methyl ether-ω-phenyl p-tert-octylphenyl phosphate, poly(ethylene glycol) tolyl p-tert-octylphenyl phosphate, poly(ethylene glycol)-α-methyl ether-ω-tolyl p-tert-octylphenyl phosphate, and poly (ethylene oxide-co-propylene oxide) methyl p-tert-octylphenyl phosphate, wherein the polymer chain contains from about 5 to about 50 repeating units or segments.

12. A surfactant composition wherein said surfactant is selected from the group consisting of poly(ethylene glycol) methyl p-tert-octylphenyl phosphate, poly(ethylene glycol)-α-methyl ether-ω-methyl p-tert-octylphenyl phosphate, poly (ethylene glycol) methyl decylphenyl phosphate, poly (ethylene glycol)-α-methyl ether-ω-methyl dodecylphenyl phosphate, poly(ethylene glycol) methyl dodecylphenyl phosphate, bis[poly(ethylene glycol)-α-methyl ether]-ω-p-tert-octylphenyl phosphate, and poly(ethylene glycol)-α,ω-methyl p-tert-octylphenyl phosphate.

13. The surfactants (XII)

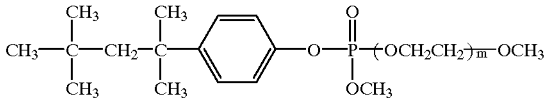

wherein m is about 17; and (XIII)

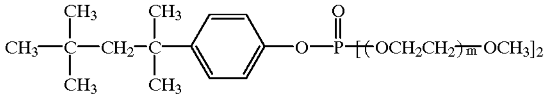

wherein m is about 17.

* * * * *